Figure 1:
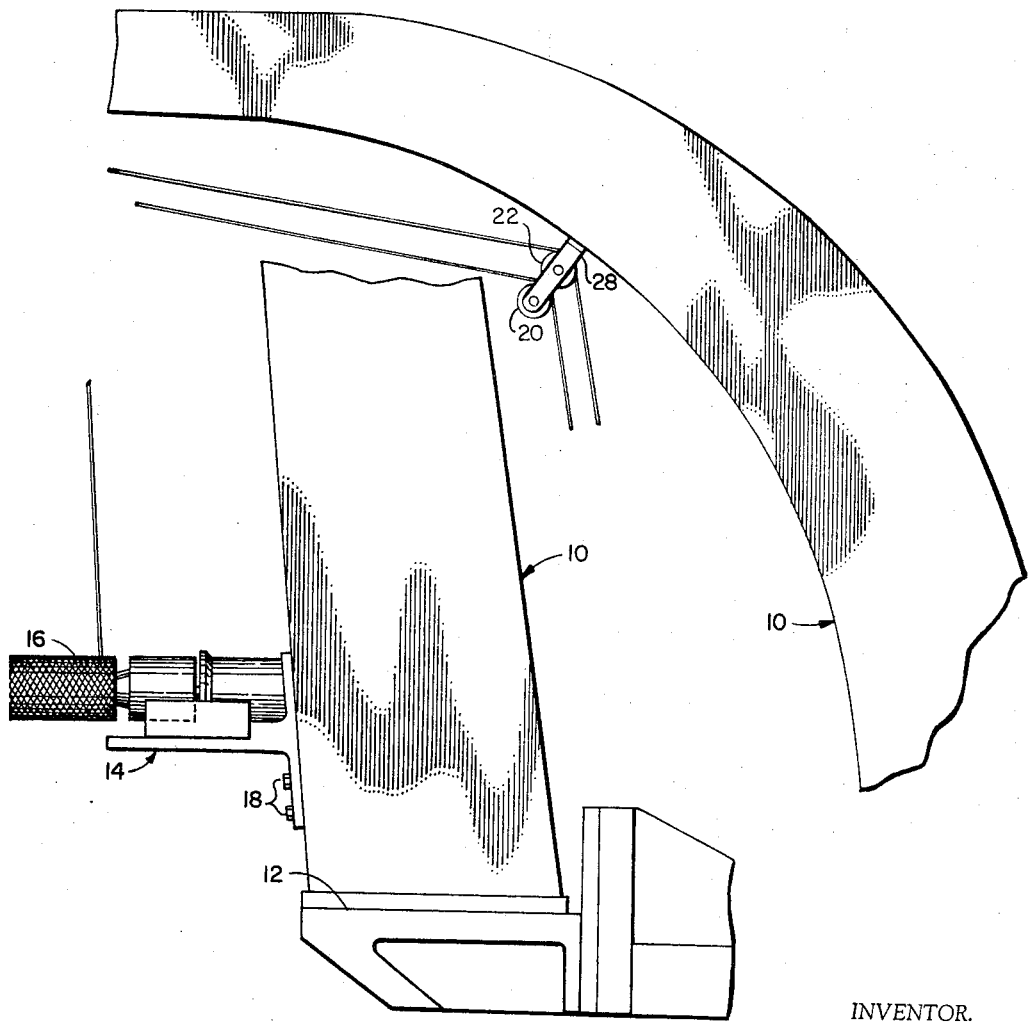

Oct. 25, 1966

D. M. WARNER 3,281,300

METHOD AND APPARATUS FOR FORMING ARTICLES FROM
PLASTIC COVERED STRANDS

Filed Aug. 28, 1962

4 Sheets-Sheet 1

INVENTOR.
DARREL M. WARNER

BY

ATTORNEY

Oct. 25, 1966　　　　　D. M. WARNER　　　　　3,281,300
METHOD AND APPARATUS FOR FORMING ARTICLES FROM
PLASTIC COVERED STRANDS
Filed Aug. 28, 1962　　　　　　　　　　　　　　4 Sheets-Sheet 2
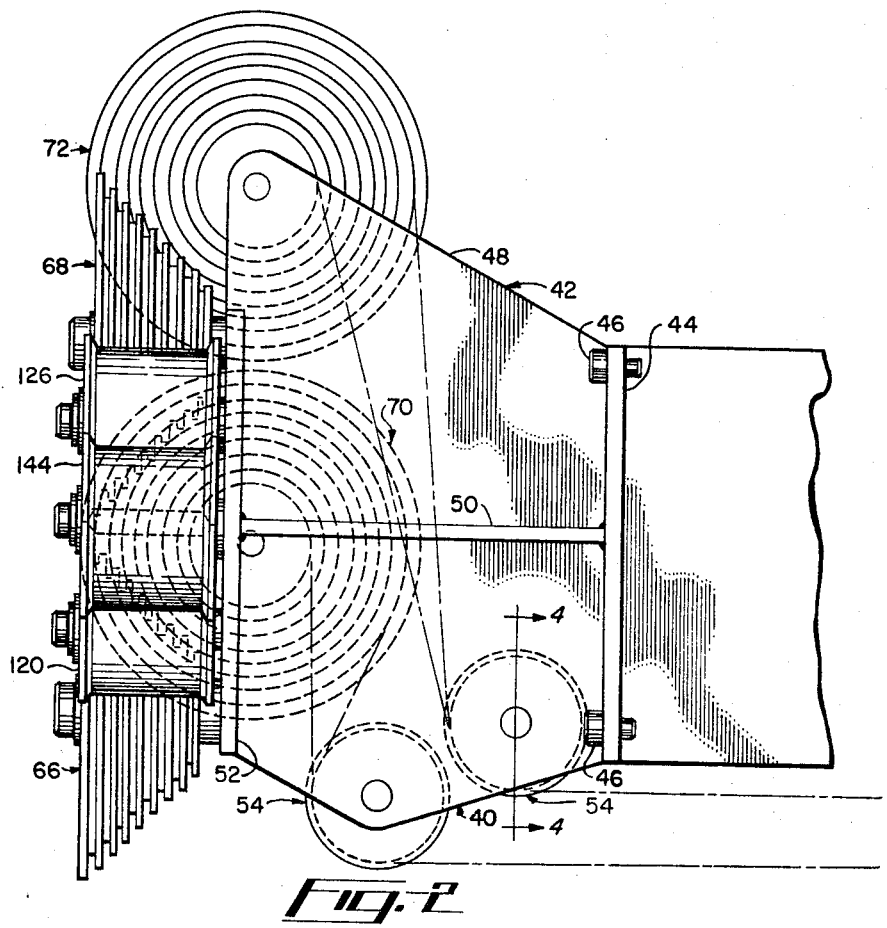
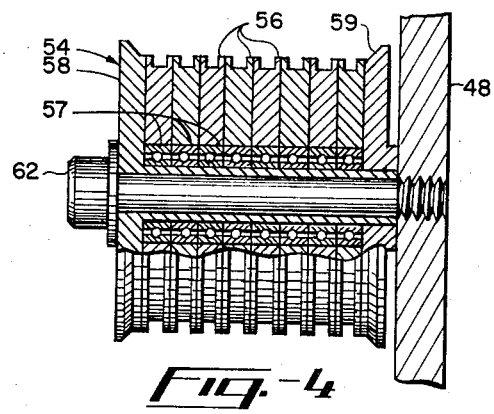
INVENTOR.
DARREL M. WARNER
BY
ATTORNEY

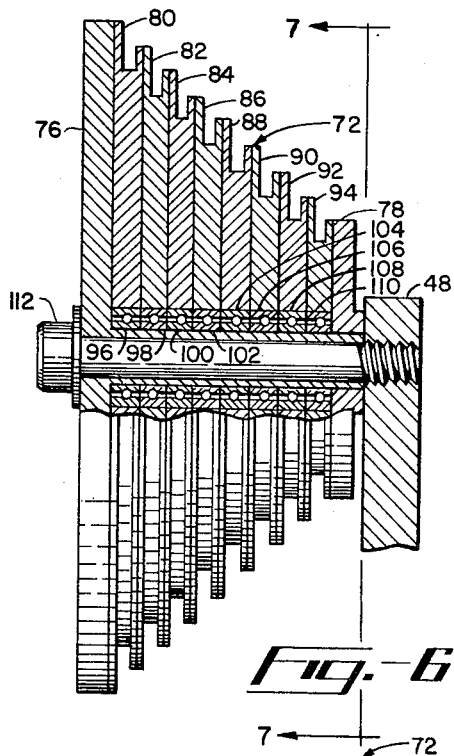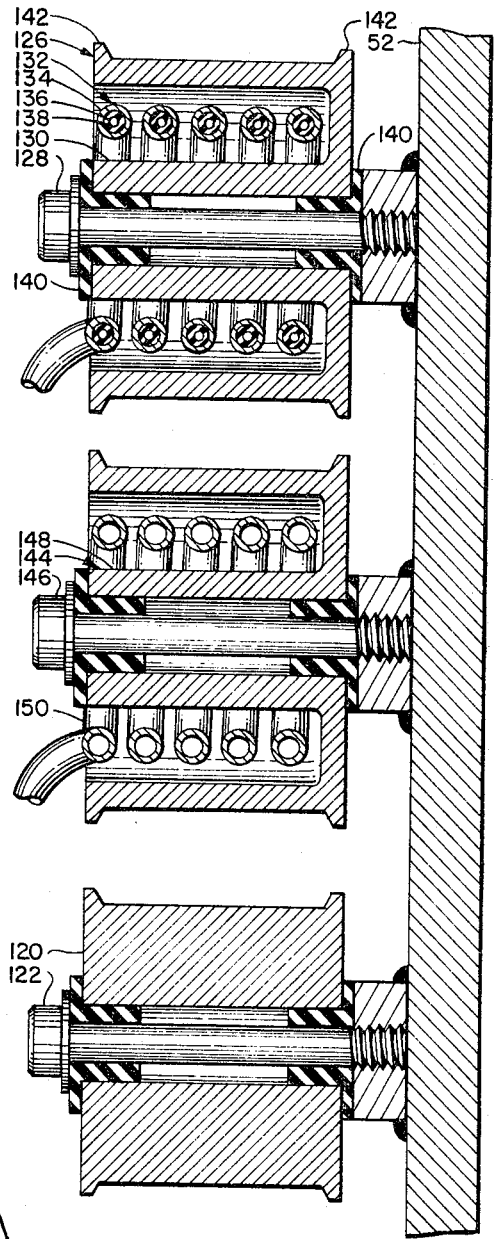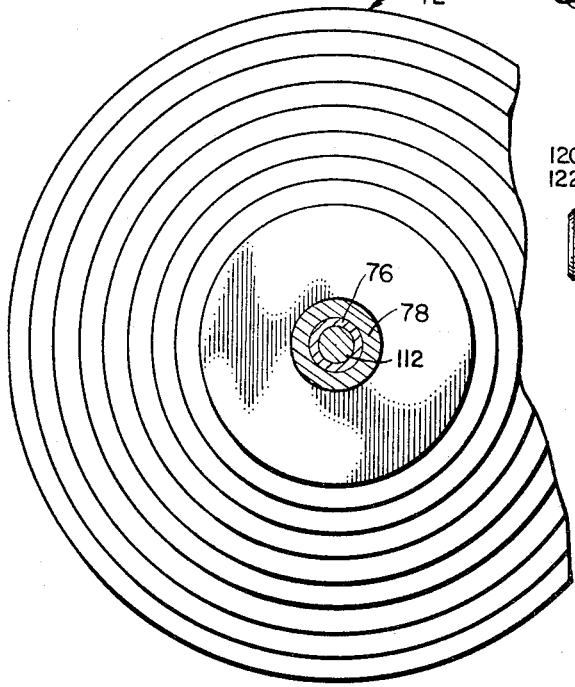

# United States Patent Office 3,281,300
Patented Oct. 25, 1966

---

3,281,300
METHOD AND APPARATUS FOR FORMING ARTICLES FROM PLASTIC COVERED STRANDS
Darrel M. Warner, West Covina, Calif., assignor to Aerojet-General Corporation, Azusa, Calif., a corporation of Ohio
Filed Aug. 28, 1962, Ser. No. 219,934
1 Claim. (Cl. 156—181)

My invention relates to the art of forming articles, such as receptacles or the like, from superimposed windings of plastic covered or plastic impregnated strands, and more particularly to an improved method for combining a plurality of plastic covered strands into a unitary band or tape during a winding operation to reduce the fabrication time for making an article from windings of strand material held together by a plastic binder.

My invention will be set forth as applied to glass fiber roving impregnated with a plastic, commonly known as "prepreg" in the glass fiber industry. "Prepeg" rovings are commonly used in industry in filament winding processes to produce such structures as cylinders, spheres, and closed containers. However, the present invention can certainly be extended to any plastic covered filament.

Attempts have been made to decrease the production time for producing articles such as receptacles, by winding a plurality of rovings simultaneously. Some difficulty has been experienced by the use of this multiple wrapping technique in that the rovings do not wrap uniformly, thereby causing irregularities in the wrapped receptacle. The rovings, each of which includes a multiple number of filaments, comprise approximately 70% of the volume of the structure and supply over 99% of its strength. The role of the resin or plastic material with which the rovings are impregnated is primarily to protect the filaments from each other by furnishing proper bearing surfaces and to hold the filaments together so that the structure will have dimensional stability. It is therefore axiomatic that the rovings be properly aligned in each layer of wrap to prevent irregularities in the structure formed thereby.

Heretofore, most winding processes consisted of winding a single filament around a mandrel or other supporting member until a sufficient number of layers of filament have been wound. Attempts have been made to wind more than one filament on the mandrel at a time without success, since adjacent filaments frequently tangled and caused irregularities and breakdowns.

In accordance with my present invention, the undesirable features of winding a multiple number of filaments about a mandrel at the same time heretofore encountered are eliminated through the use of my improved method as hereinafter disclosed. To this end, my improved method provides for the formation of a unitary tape from a multiple number of separate plastic impregnated or plastic covered filaments during a winding operation without causing irregularities in a structure to be formed thereby.

The present invention in its principal aspect resides in a method wherein a plurality of separate plastic covered or plastic impregnated strands are initially subjected to heat until the plastic material is caused to flow between adjacent strands and thereafter cooling the strands until the plastic material is returned to a "tacky" stage to produce a unitary tape. It is contemplated that the method may be practiced on a "batch" basis or in a continuous operation.

The improved method can be readily adapted to existing filament winding machinery, thereby forming a tape at the site of use. The improved method provides for the alignment of the plurality of separate plastic covered or plastic impregnated strands prior to formation of a unitary tape therefrom to insure uniformity of the width of the tape subsequently formed, while also providing for the application of the proper degree of tension to the plastic covered or plastic impregnated strands before and after the formation of the unitary tape for attaining uniformity in the tape.

It is therefore an object of the present invention to provide an improvement in the method of making a filament-wound article, such as a receptacle or the like, wherein a plurality of filaments which have been pre-covered or pre-impregnated with plastic are initially subjected to heat so that the plastic flows between the adjacent filaments to adhere the filaments together upon the subsequent cooling thereof which brings the plastic to a "tacky" stage, thereby forming a unitary tape during a winding operation to reduce the fabrication time required to complete the filament-wound article.

One of the objects of the invention having been stated, other objects and features of the invention will become apparent from the following specification and accompanying drawings.

Figure 3:
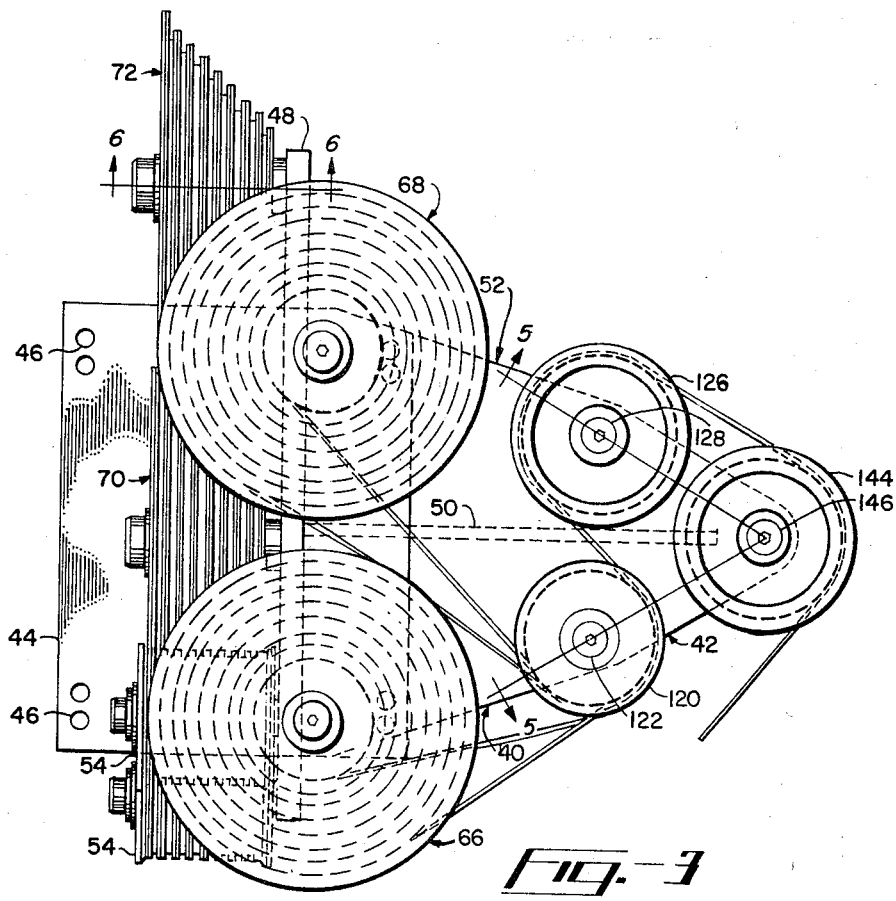

In the drawings:
FIG. 1 is a side elevation in three parts of a winding arm for a filament winding machine with an apparatus attached thereon to enable the method of forming tape in accordance with the present invention to be practiced;
FIG. 2 is an enlarged side elevation of the apparatus shown as an attachment on the winding arm for the filament winding machine as illustrated in FIG. 1;
FIG. 3 is a front elevation of the apparatus;
FIG. 4 is a sectional view taken along the line 4—4 of FIG. 2 and showing an alignment pulley as a component of the apparatus;
FIG. 5 is a sectional view taken substantially along the line 5—5 of FIG. 3, and showing an alignment roller, a heated roller, and a cooled roller as components of the apparatus;
FIG. 6 is a sectional view taken along the line 6—6 of FIG. 3, and showing a step cone pully as a component of the apparatus; and
FIG. 7 is a front view taken along the line 7—7 of FIG. 6.

Referring more specifically to the drawings and particularly to FIG. 1, the apparatus enabling the method to be practiced in accordance with the present invention may serve as an attachment for existing filament-winding machinery, thereby lending itself to forming a unitary tape from a plurality of separate plastic covered or plastic impregnated filaments at the site of use of the filament-winding machinery for substantially reducing the fabrication time for making a filament-wound article. The filament-winding machiner includes a rotatable arm 10 which is fixedly atached to a bracket 12, the bracket 12 being rotatably mounted upon a driving means (not shown). A suitable driving means and auxiliary mechanisms are illustrated and described in U.S. patent 2,115,636 issued to Kinnear et al. The reeling device 14 is employed as a means for providing constant tension on the glass fiber roving spool 16 and is attached to the arm 10 by the bolts 18. This reeling device 14 may have a tension spring tending to keep the tension on the spool 16 as the diameter changes or may be a constant tension device. Although a single reeling device is illustrated, a plurality of spools are required, one spool for each filament used to form tape. Although not shown, each of the reeling devices would be mounted on arm 10 in side by side relationship similar to the arrangement shown on FIG. 1.

Two idler pulleys 20, 22 are rotatably supported to a U shaped bracket 28.

All the filaments used to form the tape on the payoff head 40 are entirely carried by the two idler pulleys 20, 22.

Referring now to FIGS. 2 and 3, the tape forming device or payoff head 40 is shown in an enlarged view of the arrangement shown in FIG. 1. A frame 42 having a foot 44 is attached to the arm 10 by the bolts 46. An upstanding plate 48 is welded to the foot 44 with the brace 50 welded to the plate 48 and foot 44 for reinforcing purposes. Table 52 is welded to both the plate 48 and brace 50 forming the frame 42 into a rigid composite element.

Reference is made to FIGS. 2 and 4, wherein a pair of slotted pulleys 54 are shown as being mounted on plate 48 by respective shoulder bolts 62 having a threaded end portion for reception within a threaded bore provided in the plate 48. Journal 58 axially supports pulley 54 and is mounted on bolt 62. A plurality of grooved discs 56, having individual ball bearings 57, are rotatively mounted upon journal 58 and isolated by retaining rim 59.

The pulleys 54 feed the filaments to their respective cone pulleys, shown in FIGS. 2 and 6. Each cone pulley 66, 68, 70, 72 is comprised of a journal 76, retaining rim 78, and a series of grooved discs 80–94. The rim 78 is slipped onto the journal 76 providing lateral and axial support for the rotatable discs 80–94. Each disc 80–94 has its own individual ball bearing 96–110 respectively allowing each disc to act independently of each other. A respective shoulder bolt 112 supports each of the pulleys 66, 68, 70, 72 and is threaded into the plate 48 or the table 52—pulleys 66, 68 being mounted on the table 52, while pulleys 70, 72 are mounted on the plate 48. This pulley arrangement prevents slack in the filament yarn in the vicinity of the tape forming device.

These pulleys 66–72 have an approximate 45° angle between the axle and the grooved discs to aid the individual filaments in making a 90° turn from the first set of pulleys 70, 72 mounted on the plate 48 to the second set of pulleys 66, 68 mounted on the table 52. In the present example, the purpose of the pulleys is to allow the filaments of yarn to be turned 90° without entanglement. In situations where a change in direction is not required, the pulleys would not be used and the tape forming components shown on the table 52 would only be necessary.

As shown in FIGS. 2 and 3, the direction of the filaments is changed 90° by the transfer from pulleys 70, 72 to pulleys 66, 68. The filaments are rejoined and aligned by passing them over the alignment pulley 120. Shoulder bolt 122 is threaded into the table 52 to provide a journal for the alignment pulley 120 allowing it to rotate freely. The purpose of the pulley 120 is to position filaments in abutting relation prior to the tape forming process.

The "hot" or heated roller 126 is mounted on a shoulder bolt 128 that is threaded into the table 52. As shown in FIGS. 3 and 5, the hot roller 126 has an annulus shaped cavity 130 in which is mounted a resistance coil 132. This coil 132 is composed of an external tube 134, a resistance wire 136 and insulating material 138 interposed therebetween. A current source (not shown) is connected to the resistance wire 136 to provide a source of heat for the tape forming process. Insulating bushings 140 are mounted into the roller 126 to prevent excessive heating of the shoulder bolt 128. Upturned ends 142 on the hot roller 126 prevent the filaments from slipping from the roller and also maintain the filaments in abutting relation.

A cold roller 144 is rotatably mounted on the shoulder bolt 146 and has a configuration very similar to the hot roller 126. Any means for cooling the roller 144 may be inserted in the annulus shaped cavity 148 as for example, refrigerating coils 150 that are connected to a refrigerant source (not shown). Examples of cooling means for short term operations are dry ice packed into the cavity or circulating cooled water exposed to the interior of the roller cavity.

The described apparatus illustrated in FIGS. 1–6, is but one means by which the process for forming tape may be practiced. This process is basically aligning a group of plastic impregnated strands in abutting relation, heating the strands until the plastic flows to adjacent strands, and cooling the strands until the plastic returns to its tacky stage. In order to give uniformity to the tape, it is helpful to add tension to the strands in order to keep the width of the tape constant. Although this process has been described as being continuous in forming tape, it is certainly possible to make batch tape by laying the strands down beside one another and performing the heating and cooling steps in order to form the tape. Although this tape forming process may be performed as a batch method, it is obvious that uniformity and speed are attained best by using a continuous forming process.

During actual practice the tension applied to the rovings, the rate of feed, and the temperatures of the heating and cooling rollers may be varied to suit conditions and the material being used. For instance, when using an epoxy impregnated roving, the feeding rate should be approximately 100 to 500 feet per minute at 8 to 15 pounds tension. The rovings should be heated by passing them over a roller heated to 100° to 400° F. and thereafter passing the rovings over a roller cooled to a temperature of 50° to 80° F.

Epoxy resins are frequently used as the binding agent for glass fiber filaments. Epoxy resin is formed from the reaction of epichlorohydrin plus bis-phenol A. Suitable resins are described in the patent to Schroeder 2,831,830. A typical formulation for the prepreg epoxy resin takes the form of 100 parts of resin to 84 parts of hexahydrophthalic anhydride used as a hardener and 1 part benzyl dimethylamine. Using this formulation, a gel cure is given at 200° F. for 2 hours and a final cure is given at 300° F. for 4–6 hours.

Following is some terminology used in the glass fiber industry. Individual glass filaments have a diameter of approximately .002838 inch and are called monofilaments; 204 monofilaments equal one "end" which is used as a unit of size for the filaments. The numerous "ends" of the filaments are grouped together to form a multi-"end" roving and these rovings come in variations of one, eight, twelve, twenty and eighty "ends" to form a roving. Therefore the size of the roving would then be determined by the number of "ends" to give the size. For the particular components illustrated in FIGS. 1–6, 20 end roving is being shown which is equivalent to .090 inch wide. Sixteen of these rovings are used and formed into a tape 16 times .090 or 1.440 inches wide. It is clearly possible to make any width tape desired by varying the number of ends in a roving and then varying the number of rovings which are in abutment with each other prior to formation of the tape.

While this invention has been described with particular reference to plastic covered or plastic impregnated strands of glass fiber, it will be understood that other plastic covered or plastic impregnated strands of suitable character, such as yarn, steel, or titanium, are also applicable to the invention.

Although a specific embodiment of the invention has been shown and described, it will be understood, of course, that it is only illustrative and that various modifications may be made therein without departing from the scope and spirit of this invention as defined in the appended claim.

I claim:

A method of forming tape comprising the steps of: feeding a plurality of epoxy impregnated rovings at a rate of 100 to 500 feet per minute with adjacent rovings being disposed in abutting non-adherent relation, applying tension of 8–15 pounds to the rovings, passing the rovings over a roller heated to a temperature of 100 to 400°

F., and thereafter passing the rovings over a roller cooled to a temperature of 50 to 80° F.

References Cited by the Examiner

UNITED STATES PATENTS

| | | | |
|---|---|---|---|
| 799,374 | 9/1905 | Gray et al. | 156—181 |
| 2,072,926 | 3/1937 | Taylor | 156—180 |
| 2,224,370 | 12/1940 | Westcott | 156—498 X |
| 2,625,498 | 1/1953 | Koch | 156—180 |
| 2,757,111 | 7/1956 | Henderson | 156—180 |
| 2,775,860 | 1/1957 | Morrison | 156—180 |
| 2,788,838 | 4/1957 | Crabbe | 156—498 X |
| 2,870,055 | 1/1959 | Coney et al. | 156—181 |
| 3,037,898 | 6/1962 | Zumofen | 156—441 X |
| 3,118,806 | 1/1964 | Grantham | 156—181 |

FOREIGN PATENTS

| | | |
|---|---|---|
| 1,285,942 | 1/1962 | France. |
| 1,087,559 | 8/1960 | Germany. |

EARL M. BERGERT, *Primary Examiner.*

D. J. DRUMMOND, *Assistant Examiner.*